United States Patent [19]
Maesako

[11] Patent Number: 5,216,206
[45] Date of Patent: Jun. 1, 1993

[54] EDGE SADDLE WITH PLURAL STEPS

[75] Inventor: Yoshiyuki Maesako, Tokyo, Japan

[73] Assignee: Denka Shoji Co., Ltd., Tokyo, Japan

[21] Appl. No.: 622,360

[22] Filed: Dec. 4, 1990

Related U.S. Application Data

[63] Continuation of Ser. No. 389,177, Aug. 3, 1989, abandoned.

[30] Foreign Application Priority Data

Apr. 29, 1989 [JP] Japan ................................. 1-51192[U]

[51] Int. Cl.⁵ ............................................. H01B 17/26
[52] U.S. Cl. ................................... 174/153 G; 174/151
[58] Field of Search ............ 174/65 G, 152 G, 153 G, 174/151; 16/2; 24/141; 248/56

[56] References Cited

U.S. PATENT DOCUMENTS

| | | | |
|---|---|---|---|
| 2,424,757 | 7/1947 | Klumpp, Jr. | 174/153 G |
| 3,229,026 | 7/1964 | Sulzer | 174/153 G X |
| 3,272,461 | 9/1966 | Larkin | 174/153 G X |
| 3,372,441 | 3/1968 | Fisher | 174/153 G X |
| 3,906,586 | 9/1975 | Arnold | 174/153 G X |

Primary Examiner—Leo P. Picard
Assistant Examiner—Trinidad Korka
Attorney, Agent, or Firm—Rosen, Dainow & Jacobs

[57] ABSTRACT

The present invention relates to an edge saddle having plural steps which is to be installed within a through groove or through hole of a chassis plate of an electric appliance or electrical instrument. The edge saddle comprises a frame body having a base portion, first engaging portions including stepped contact portions for engaging the inner side of a chassis plate and for contacting the inner surface of a through groove or through hole of the chassis plate, and a second engaging portion for engaging the outer side of the chassis plate to hold the chassis plate together with the first engaging portions, the stepped contact portions including plural steps along the direction of the plate thickness of the chassis plate. The first engaging portions are separated from the frame body by slits extending to its base portion and are supported by the base portion like a cantilever. The top portions of the first engaging portions are formed as arrow-shaped portions which expand and incline from the top toward the base portion.

1 Claim, 4 Drawing Sheets

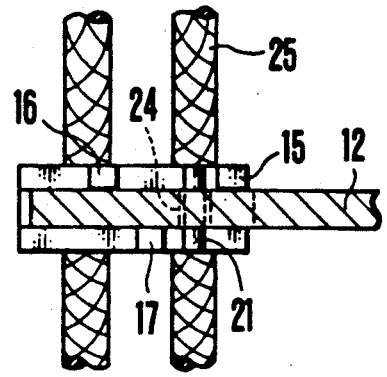
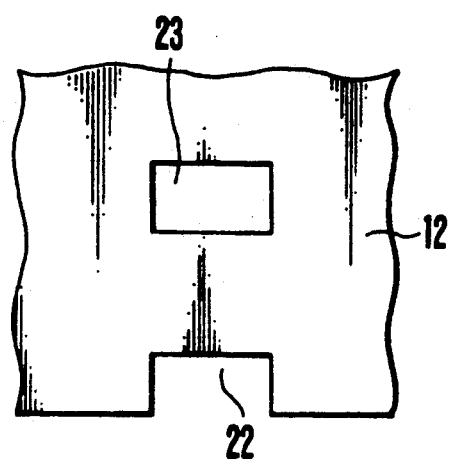
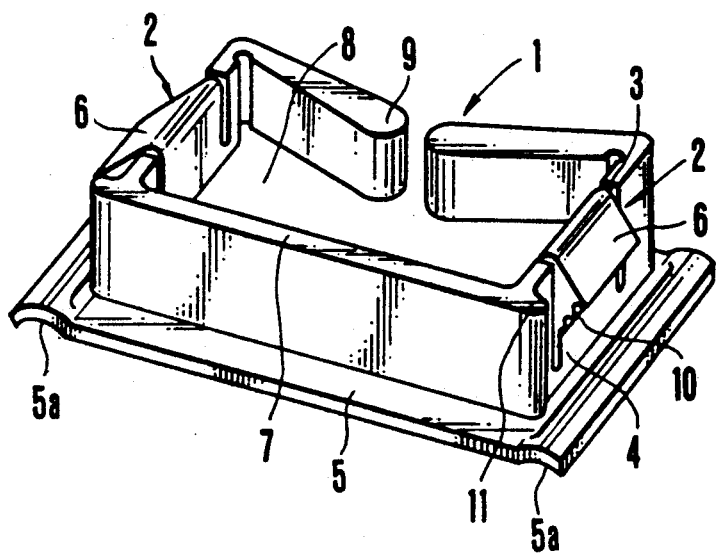

EDGE SADDLE WITH PLURAL STEPS

This application is a continuation of application Ser. No. 389,177, filed Aug. 3, 1989, now abandoned.

BACKGROUND OF THE INVENTION

The present invention relates to an edge saddle which can be fitted in a through groove or a through hole of a chassis plate of an electric appliance or electrical instrument to protect wirings which pass through said through groove or through hole and, more particularly, relates to an edge saddle with plural steps that is able to be fitted in chassis plates of different thicknesses.

BRIEF DESCRIPTION OF THE DRAWINGS

For the purpose of illustrating the invention, there is shown in the accompanying drawings one form of edge saddle which is presently preferred, it being understood that the invention is not intended to be limited to the precise arrangements shown therein.

FIG. 4 is an enlarged side view corresponding to FIG. 2, FIG. 5 is a plan view of a portion of a chassis plate, FIG. 6 is a perspective view of an embodiment of the present invention.

The wirings of an electric appliance or electrical instrument are extended through through grooves or through holes of a chassis plate to the outside. The through grooves or through holes are made by cutting through the chassis plate. The wirings tend to be cut or broken by the cut edges of the through grooves or through holes of the chassis plate when the wirings pass therethrough. Accordingly, edge saddles are fitted in such through grooves or through holes to protect the wirings.

Figure 1:
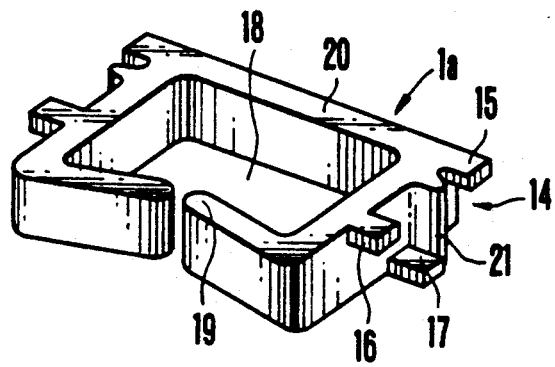
FIG. 1 is a perspective view of an edge saddle.

FIG. 1 shows an edge saddle 1a. The edge saddle 1a is composed of synthetic resin material and comprises a rectangular-shaped frame body 20 and engaging portions 14 provided on both sides of the frame body 20. The frame body 20 delimits a space portion 18 in which the wirings pass through, as illustrated, and includes a flexible portion 19 through which the wirings are put into the space portion 18 from the transverse direction.

The engaging portions 14 each comprises two engaging pieces 15, 16 on the outer side and an engaging piece 17 on the inner side. All of the engaging pieces are formed to project from the side walls of the frame body 20.

Figure 2:
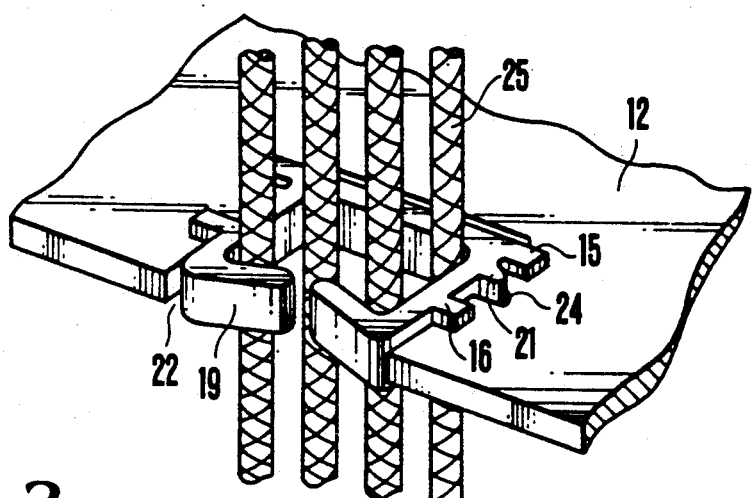
FIG. 2 is a perspective view showing the edge saddle fitted in a chassis plate and through which wirings are passed.
Figure 3:
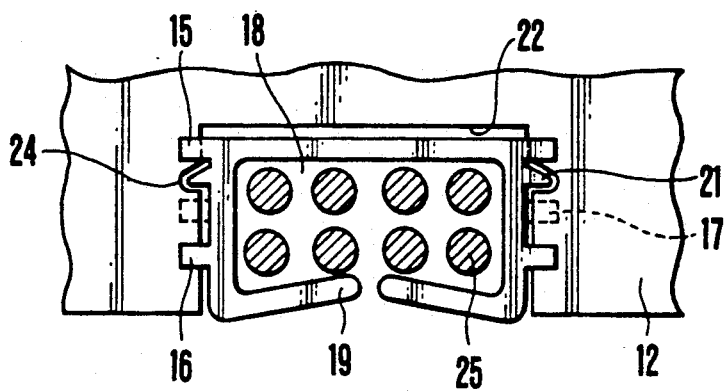
FIG. 3 is a plan view corresponding to FIG. 2.

FIGS. 2 through 4 show the edge saddle 1a fitted in the chassis plate 12. As shown in FIG. 5, the through groove 22 and/or the through hole 23 for the wirings to pass through are provided by cutting through the chassis plate 12 appropriately. FIG. 4 is a side view perpendicular to the chassis plate 12 showing the state of edge saddle 1a in the through groove 22. The chassis plate 12 is inserted between the engaging pieces 15, 16 of the outer side and the engaging pieces 17 of the inner side to be fixed in the vertical direction. Another engaging piece 21 is fitted in a concave groove 24 of the chassis plate 12 to fix the edge saddle in the horizontal direction. The wirings 25 are inserted through the flexible portion 19 into the space portion 18 to be maintained by the edge saddle 1a.

When fitting the edge saddle 1a which is constructed as above mentioned in the chassis plate 12, the edge saddle 1a can be easily inserted from the opening into the through groove 22 without any problem. However, generally speaking, it is difficult to fit the edge saddle 1a in the through hole 23 shown in FIG. 5, so that the edge saddle is especially adapted for the through groove 22. As depicted clearly in FIG. 4, the space between the engaging pieces 15, 16 and engaging piece 17 is determined to be approximately equal to the dimension of the plate thickness of the chassis plate 12 so that the chassis plate 12 is held in the space, as previously mentioned. Accordingly, the chassis plate 12 to be used is determined by the dimension of that space of the edge saddle 1a. That is to say, such edge saddle cannot be used for another chassis plate 12 with different plate thickness. Generally, chassis plates 12 of several plate thicknesses are used for electric appliances or electrical instruments and, therefore, it is necessary to prepare several kinds of edge saddles 1a to accommodate such chassis plates 12. Accordingly, there are problems of cost increase due to production of several kinds of edge saddles. Also, the work involved becomes complicated in order to select the edge saddle 1a to be used; and the management thereof requires much time and labor.

SUMMARY OF THE INVENTION

Accordingly, it is an object of the present invention to provide, in order to overcome the above-described problems, an edge saddle having plural steps to be able to be fitted in chassis plates of different thicknesses so as to improve the work efficiency, which can reduce the cost and simplify the management by uniforming its configuration in spite of its multiple usages, and which can be relatively easily fitted in the through holes of chassis plates.

In order to attain the object above mentioned, the present invention provides an edge saddle having plural steps that comprises a frame body having a base portion, first engaging portions including stepped contact portions which engage the inner side of a chassis plate and contact the inner surface of a through groove or through hole of said chassis plate, and a second engaging portion in the form of a flange which engages the outer side of said chassis plate in order to hold said chassis plate together with said first engaging portions, said stepped contact portions including plural steps along the direction of the plate thickness of said chassis plate; and said first engaging portions are separated from the frame body by slits extending to its base portion and are supported like a cantilever by said base portion, and, furthermore, the top portion of each first engaging portion is formed as an arrow-shaped portion expanding and inclining from the top toward said base portion.

Since stepped contact portions are formed on the first engaging portions, the step corresponding to the plate thickness of the chassis plate will be selected to contact the inner surface of the chassis plate and, accordingly, the edge saddle is fitted in the chassis plate by holding the chassis plate between said first engaging portions and said second engaging portion. Since said first engaging portions are supported by the base portion of the frame body like a cantilever and the top portions are formed as arrow-shaped portions, said top portions are bent inward to reduce the space therebetween in the narrowing direction when the edge saddle is pushed into a through hole of the chassis plate. Thus, the edge saddle can be easily inserted into and engaged with and fitted in the through hole.

DESCRIPTION OF THE PREFERRED EMBODIMENT

The embodiment of the present invention will be discussed hereinafter in accordance with the accompanying drawings.

Figure 7:
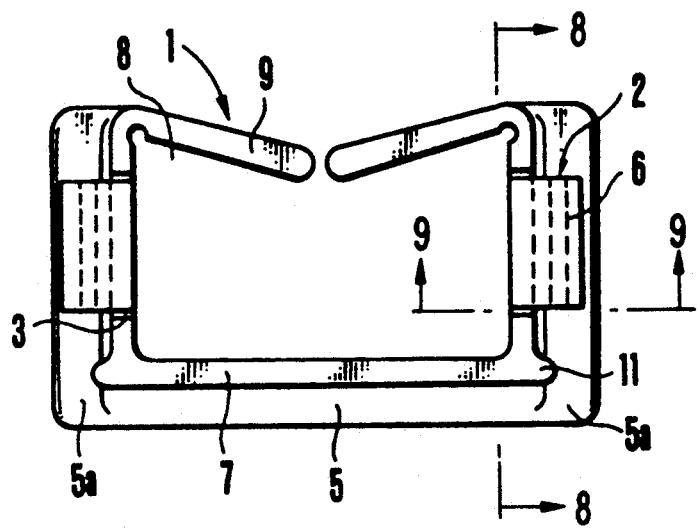
FIG. 7 is a plan view corresponding to FIG. 6.
Figure 8:
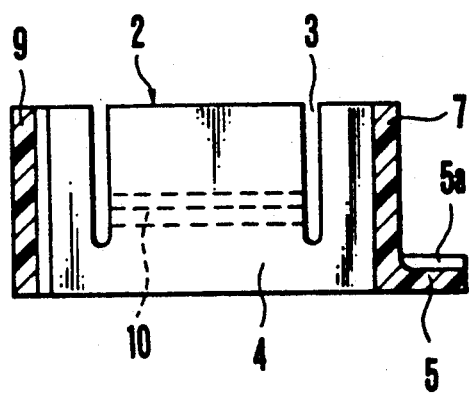
FIG. 8 is a sectional view in the direction of line 8—8 in FIG. 7.
Figure 9:
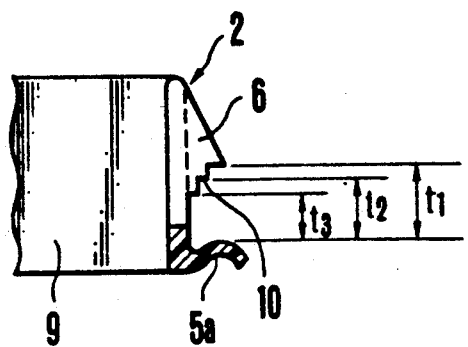
FIG. 9 is a sectional view in the direction of line 9—9 in FIG. 7.

As shown in FIGS. 6 and 7, the edge saddle 1 is constructed by a rectangular-shaped frame body 7, first engaging portions 2 provided on two opposite sides of the frame body 7, and a second engaging portion 5 provided on the bottom of the frame body 7 in the form of a protruding flange. In this embodiment, the frame body 7 delimits a space portion 8 and includes flexible portions 9 in the same manner as in the prior art. As shown in FIG. 8, each first engaging portion 2 is separated from the frame body 7 by two slits 3 which are made by cutting a portion of the side walls of the frame body 7 in the vertical direction to the base portion 4, and it is supported by the base portion 4 like a cantilever. As shown in FIG. 9, each first engaging portion 2 also includes an arrow-shaped portion 6 which is projected from the side of the frame body 7 and is provided with the stepped portion 10 on the lower and inner surface thereof. The stepped portion 10 is formed as three steps in this embodiment, but the number of the steps is not limited to three steps. An outer surface of the arrow-shaped portion 6 is expanding and inclined from the top of the first engaging portion 2 toward the base portion 4 on one side. However, the shape of the portion 6 is not restricted to this shape shown.

The second engaging portion 5 is a nearly flat flange which is projected from the bottom periphery of the frame body 7 except at the periphery of the flexible portion 9. This second engaging portion 5 is positioned oppositely to the stepped portions 10 of the first engaging portions 2. Arc-shaped portions 5a rounded out to the upward in arc shape are formed at the locations opposite to the stepped portions 10. These arc-shaped portions 5a contact and push the chassis plate 12 so as to ensure engagement with the chassis plate 12 when the second engaging portion 5 contacts the chassis plate 12.

Figure 12:
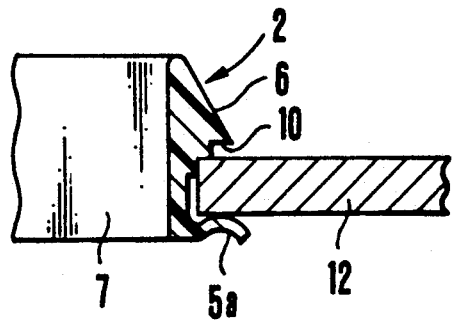
FIG. 12 is a partial sectional view showing the edge saddle fitted in a chassis plate.

The chassis plate 12 is inserted between the stepped portions 10 of the first engaging portions 2 and the arc-shaped portions 5a of the second engaging portion 5 to thus be held by them, as shown in FIG. 12. However, the clearances between them are different, such as t1, t2, and t3 shown in FIG. 9. Accordingly, the edge saddle of the present invention is able to be fitted to chassis plates 12 of many different thicknesses.

Figure 11:
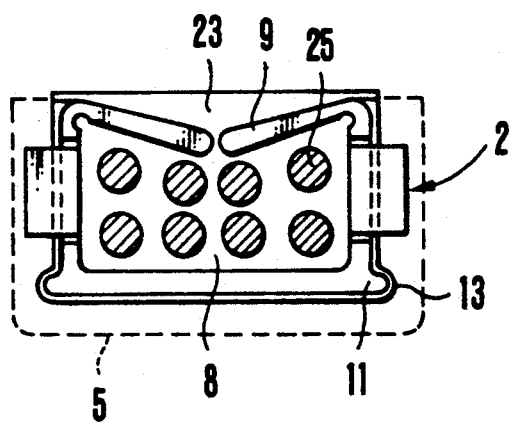
FIG. 11 is a plan view showing the edge saddle fitted in a through hole of a chassis plate.

Engaging pieces 11 are provided at the corners of the frame body 7. As shown in FIG. 11, the engaging pieces 11 fit in concave grooves 13 of the chassis plate 12 in order to prevent movement of the edge saddle in the horizontal direction.

Figure 10:
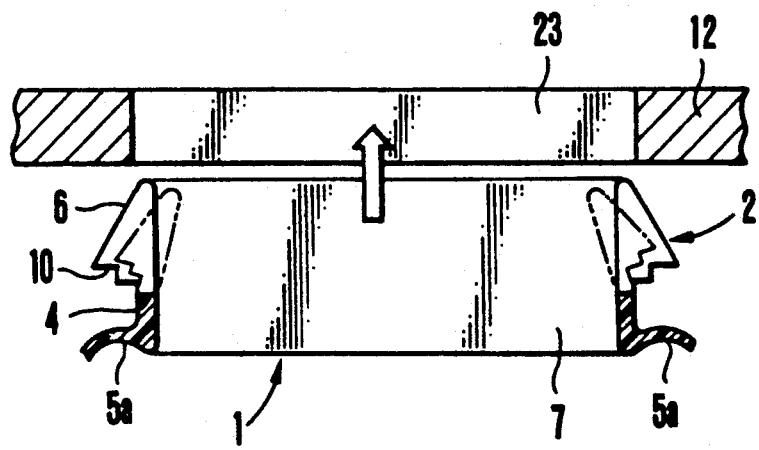
FIG. 10 is a sectional view showing a transformed state of the engaging pieces when the edge saddle is fitted in a through hole of a chassis plate.

FIG. 11 shows the edge saddle 1 of the present invention fitted in the through hole 23 provided in the middle of the chassis plate 12 and through which the wirings 25 are passed. FIG. 10 illustrates the insertion manner of the grommet 1 in the case of FIG. 11. The edge saddle 1 is inserted from the lower side of the chassis plate 12 in FIG. 10. In this case, since the first engaging portions 2 are projected from the sidewalls of the frame body 7, it is difficult to insert the edge saddle 1 into the through hole 23 as it is. However, as previously discussed, since the first engaging portions 2 are constructed to be bendable on the base portion 4 as a fulcrum and an arrow-shaped portion 6 is formed on the lower side of each first engaging portion 2, the first engaging portions 2 bend inward as shown by a two-dot chain line in FIG. 10 to thus reduce the dimension therebetween when an arrow-shaped portion 6 contacts the periphery of the through hole 23. Accordingly, the edge saddle 1 can be easily inserted into the through hole 23 by relatively small force. After insertion, such first engaging portions 2 regain their original shape and the stepped portions 10 engage the inner surface of the chassis plate 12 and contact the inner surface of the periphery of the through hole 23. At the same time, the arc-shaped portions 5a of the second engaging portion 5 contact the outer surface of the chassis plate 12. Accordingly, both engaging portions hold the chassis plate 12 to thus fit the grommet 1 in the chassis plate 12.

As mentioned previously, the edge saddle 1 of the present invention not only can be fitted in the through groove 22, but also can be fitted smoothly in the through hole 23. The frame body 7 of the edge saddle 1 of the present invention is constructed as rectangular-shape, as mentioned above; but, the shape of this frame body is not restricted to that shape. Polygon-shape, round-shape, ellipse-shape, C-shape and the like can be usable as the frame body. The grommet of the present invention may be optionally of open-loop or closed loop shape. The flexible portions 9 are not essential when the grommet 1 will be used in the through hole 23. In this embodiment, the first engaging portions 2 are provided on both sidewalls of the frame body 7, but they can be provided on three sidewalls or all side walls of the frame body 7. Furthermore, the second engaging portion 5, shown as a nearly flat flange in the embodiment, can be provided as stepped-type.

The remarkable meritorious effects are obtained by the present invention in the following:

(1) The edge saddle of the present invention is able to be fitted in chassis plates of different thicknesses.

(2) Thus, the work efficiency to furnish the electric appliance or electrical instrument with wirings can be improved remarkably.

(3) The kinds of edge saddles to be maintained will be reduced. Management of the edge saddle will become easy.

(4) Mass production of the edge saddle can be achieved due to its uniform shape so that the cost is reduced.

(5) The edge saddle of the present invention can be fitted in every through portion of the chassis plate so that wiring work becomes easy.

The invention having been best described, it will be obvious that the same may be varied in many ways. Such variations are not to be regarded as a departure from the spirit and scope of the invention and all such modifications as would be obvious to one skilled in the art are intended to be included in the scope of the following claims.

What is claimed is:

1. An edge saddle adapted to be installed in a through groove of a chassis plate of an electric appliance to protect wires passing therethrough, the inner edge of the through groove of the chassis plate defining a concave groove, said edge saddle comprising:

a frame having a base portion, and at least one flexible portion integral with said base portion and cooperating with said base portion to define a space for receiving the wires, said flexible portion being movable with respect to said base portion to form a clearance through which the wires may be passed to enter the space;

first engaging portions each of which is integral at a part thereof with said frame base portion and inwardly movable with respect to said frame base portion, each first engaging portion including a projected part which projects outwardly with respect to said frame base portion and is engageable with a first side surface of the chassis plate, said projected part having a plurality of steps which are adapted to contact an inner edge of the chassis plate defining the through groove;

a second engaging portion in the form of a flange integral with said frame base portion and extending outwardly with respect to said frame base portion, said second engaging portion being engageable with a second side surface of the chassis plate and located opposite to the projected part of said first engaging portions to hold the chassis plate between it and said first engaging portions, the first and second side surfaces of the chassis plate being opposite to one another; and a third engaging portion integral with said frame base portion and extending vertically with respect to the chassis plate and throughout the opposite sides of the chassis plate, said third engaging portion being engaged with the concave groove of the chassis plate to prevent movement of said edge saddle in a direction parallel to the first and second side surfaces of the chassis plate.

* * * * *